United States Patent
Baxter

(10) Patent No.: US 10,289,947 B2
(45) Date of Patent: May 14, 2019

(54) IMPACT RFID TAG

(71) Applicant: Parker-Hannifin Corporation, Cleveland, OH (US)

(72) Inventor: Daniel Brent Baxter, Layton, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 57 days.

(21) Appl. No.: 15/644,059

(22) Filed: Jul. 7, 2017

(65) Prior Publication Data

US 2018/0018550 A1 Jan. 18, 2018

Related U.S. Application Data

(60) Provisional application No. 62/361,028, filed on Jul. 12, 2016.

(51) Int. Cl.
*G06K 7/00* (2006.01)
*G06K 19/077* (2006.01)

(52) U.S. Cl.
CPC . *G06K 19/07773* (2013.01); *G06K 19/07749* (2013.01)

(58) Field of Classification Search
CPC ............... G06K 19/005; G06K 19/077; G06K 19/07728
See application file for complete search history.

(56) References Cited

U.S. PATENT DOCUMENTS

| | | | |
|---|---|---|---|
| 7,163,152 B2* | 1/2007 | Osborn | A45C 11/182 235/486 |
| 7,405,656 B2 | 7/2008 | Olsen | |
| 8,068,028 B2 | 11/2011 | Phaneuf | |
| 8,123,133 B2* | 2/2012 | Dubois | G06F 21/87 235/486 |
| 8,567,459 B2* | 10/2013 | Kitchen | A45C 11/182 150/147 |
| 9,251,458 B2 | 2/2016 | Finn et al. | |
| 9,755,682 B2* | 9/2017 | Byler | H04B 1/38 |
| 2006/0244597 A1 | 11/2006 | Tethrake et al. | |
| 2011/0121079 A1* | 5/2011 | Lawrence | G06K 19/07 235/488 |
| 2011/0284642 A1* | 11/2011 | Brown | G01V 15/00 235/492 |
| 2017/0249543 A1* | 8/2017 | Smith | G06Q 10/0833 |

FOREIGN PATENT DOCUMENTS

WO  2007/066204 A2  6/2007

\* cited by examiner

*Primary Examiner* — Thien M Le
*Assistant Examiner* — April A Taylor
(74) *Attorney, Agent, or Firm* — Renner, Otto, Boisselle & Sklar, LLP

(57) ABSTRACT

A radio frequency identification (RFID)-enabled article includes a housing formed from a first material and having an RF chamber, and an RFID transponder arranged within the chamber, the RFID transponder including an antenna for transmitting and receiving data. The RF chamber is dimensioned to form a pocket around the antenna such that the antenna is separated by inner surfaces of the chamber by a predefined minimum distance.

14 Claims, 2 Drawing Sheets

SECTION B-B

IMPACT RFID TAG

This application claims priority of U.S. Provisional Application No. 62/361,028 filed Jul. 12, 2016, which is hereby incorporated herein by reference.

FIELD OF INVENTION

The present invention relates generally to RFID tags, and more particularly to a rugged housing for RFID tags.

BACKGROUND

Radio-frequency identification (RFID) is the wireless use of radio-frequency electromagnetic fields to transfer data, often used to automatically identify and/or track objects via RFID devices attached to or otherwise associated with the objects. The RFID devices may contain electronically stored information. Some devices are powered by and read at short ranges (a few centimeters to a few meters) via magnetic fields (electromagnetic induction). These devices typically have no battery. Rather, they collect energy from the interrogating electromagnetic field. Other devices may use one or more local power sources such as a battery and then act as a transponder to emit radio waves. Battery powered tags may operate at up to hundreds of meters. RFID tags may be included in seals as described in U.S. Pat. No. 8,282,013, incorporated by reference herein in its entirety.

SUMMARY OF INVENTION

Described herein and shown in the figures is an article such as a container with an RFID transponder (chip or tag). The container allows identification and/or tracking of the article (or contents therein) in a wireless manner that does not require any additional components or attachments to the container, while providing a robust environment for the RFID tag to minimize the likelihood of damage to the RFID tag. Moreover, the enclosure does not interfere with the communications to the RFID tag, thereby optimizing performance of the RFID transponder.

According to one aspect of the invention, a radio frequency identification (RFID)-enabled article includes: a housing formed from a first material and having an RF chamber; and an RFID transponder arranged within the chamber, the RFID transponder including an antenna for transmitting and receiving data, wherein the RF chamber is dimensioned to form a pocket around the antenna such that the antenna is separated from each inner surface of the chamber by a predefined minimum distance.

Optionally, the housing comprises at least one window arranged relative to the antenna, the window having a wall thickness that is less than a wall thickness of other portions of the housing.

Optionally, the window is configured to provide low attenuation of a signal into and out of the RF chamber.

Optionally, the article includes at least one cover arranged over the chamber, wherein the cover has a wall thickness that is less than a wall thickness of other portions of the housing.

Optionally, the RFID transponder is covered by a layer formed of a plastic or other polymeric second material which may the same as or different from the first material.

Optionally, the pocket is dimensioned to cause RF energy to resonate around the antenna.

Optionally, the pocket is formed around all sides of the antenna.

According to one aspect of the invention, the article includes: a housing formed from a first material and having an RF chamber; and an RFID transponder arranged within the chamber, the RFID transponder including an antenna for transmitting and receiving data, wherein at least one window is formed in the housing over the chamber, the at least one window providing low attenuation of a signal into and out of the RF chamber.

Optionally, a length, width and thickness of the chamber is greater than a respective length, width and thickness of the RFID transponder.

Optionally, the housing further comprising a plurality of mounting members configured to positionally fix the RFID transponder relative to the housing.

Optionally, the housing is formed from a non-conductive material.

Optionally, the non-conductive material comprises plastic.

Optionally, the article is a container.

According to another aspect of the invention, a method of forming a radio frequency identification (RFID)-enabled article, RFID article including an RFID transponder and antenna for transmitting and receiving data, the method comprising forming a radio frequency (RF) chamber around the RFID enabled article, wherein the RF chamber is dimensioned to form a pocket around the antenna such that the antenna is separated from each inner surface of the chamber by a predefined minimum distance.

Optionally, the method includes forming at least one window in the housing and relative to the antenna, the window having a wall thickness that is less than a wall thickness of other portions of the housing.

Optionally, the method includes covering the RFID transponder with a layer formed of polymeric material.

The foregoing and other features of the invention are hereinafter described in greater detail with reference to the accompanying drawings.

DETAILED DESCRIPTION

Figure 1:
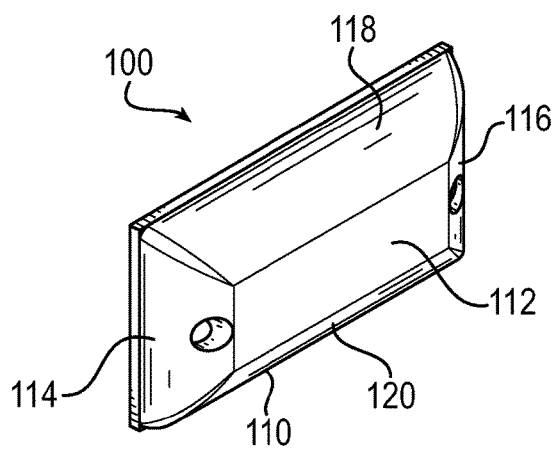
FIG. 1 is a perspective view of an exemplary RFID-enabled container.
Figure 2:
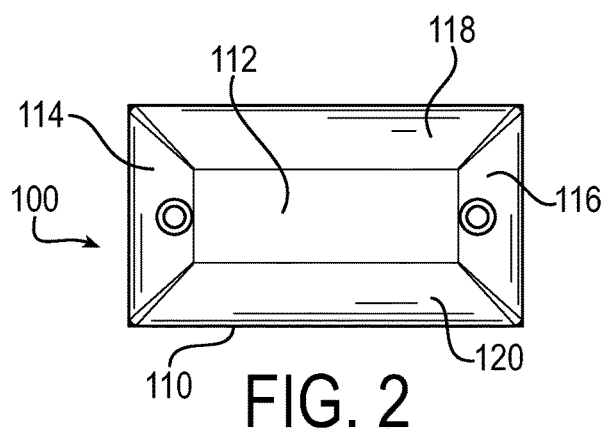
FIG. 2 is a top view of the exemplary RFID-enabled container.
Figure 3:
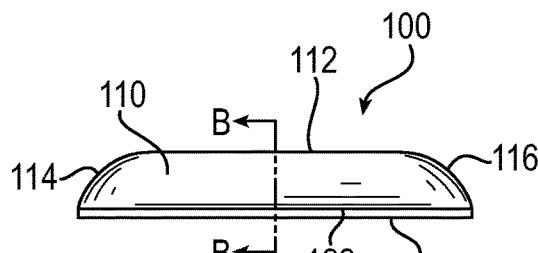
FIG. 3 is a side view of the exemplary RFID-enabled container.
Figure 4:
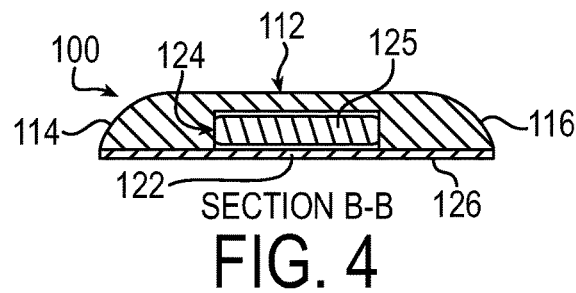
FIG. 4 is a cross-sectional view of the exemplary RFID-enabled container taken through the RFID transponder.
Figure 5:
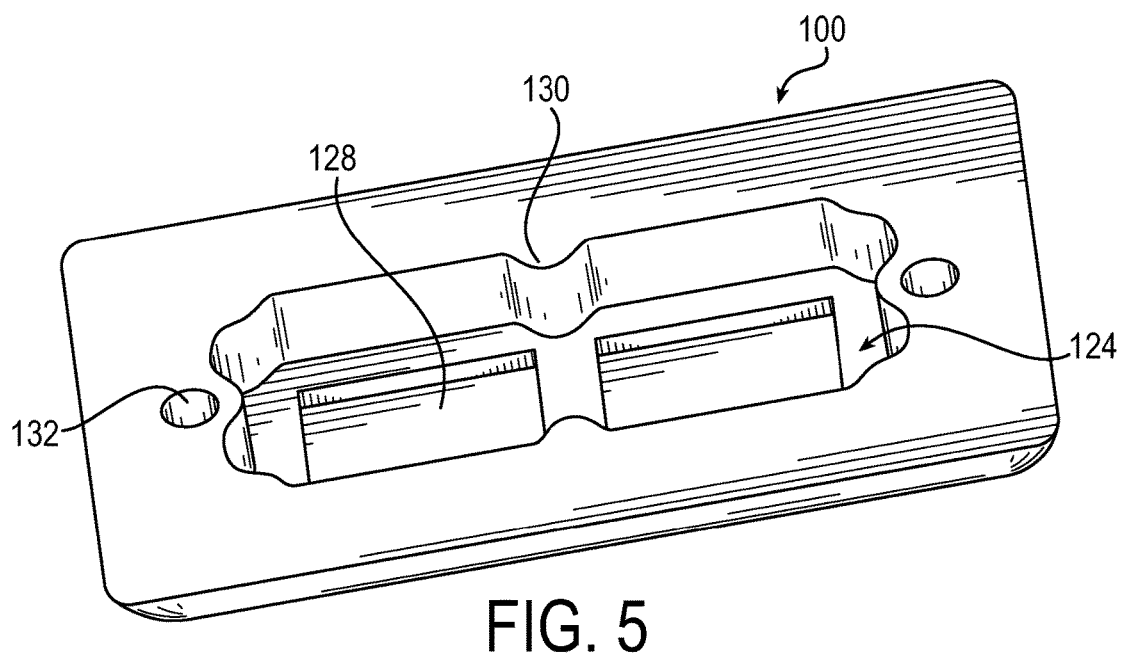
FIG. 5 is a bottom perspective view of an exemplary RFID-enabled container.

Conventional RFID-enabled articles, especially those having rugged enclosures in which an RFID transponder is associated, tend to interfere with RF signals transmitted to/from the RFID transponder. More particularly, the dielectric constant of the material that forms the container can impede RF signals to/from the transponder. Since the RF transponder is arranged within such material, the RF signal may be attenuated by the material, and this can reduce the range of the RFID device. By minimizing the material surrounding the RF transponder (and in particular the antenna of the transponder) in accordance with the invention, attenuation of the RF signal can be minimized.

Referring now to FIGS. 1-4, shown are several views of an exemplary RFID container 100 in accordance with aspects of the present invention. The container 100 includes a body 110 formed of a non-conductive material, such as plastic or other polymeric material, and may be formed by way of injection-molding. The body 110 may include six walls.

A top wall 112 (also referred to as a cover) of the body 110 may be formed separately from the rest of the body or may be manufactured integral with the rest of the body. The top wall 112 may be formed from the same material as that of the body 110 or from a different material. The top wall 112 can be configured to be openable/closeable with respect to the body 110. Alternatively, the top wall 112 may be completely removable from the rest of the body 110. As another alternative, the top wall 112 may be non-removable from the body 110.

The container 100 also includes a bottom wall 122. The bottom wall 122 forms with sloped sidewalls 114, 116, 118, 120 a central radio frequency (RF) chamber 124 for holding an object, such as an RFID transponder 125 or the like. The sloped sidewalls provides improved impact resistance relative to a container formed with non-sloped sidewalls. A mounting means 126, such as an adhesive tape or the like, may be formed on or attached to the bottom wall 122 to facilitate mounting of the container to an object.

An RFID transponder 125 may be mounted within the chamber 124, the RFID transponder 125 including an antenna for receiving and transmitting data. The RF transponder 125 may be any conventional RF transponder known in the art. The RF chamber 124 is dimensioned to form an air pocket around at least part or all of the antenna of the RFID transponder such that the antenna is separated by inner surfaces of the RF chamber 124 by a predefined minimum separation distance. Preferably, the minimum separation distance is 0.075 inches, and more preferably the minimum separation distance is 0.100 inches. The RF chamber 124 provides a cavity for radio waves to excite the antenna of the RFID transponder 125 without impeding the signal, and also provides an efficient path for the signal to return to an external RFID reader.

The pocket can be configured to cause RF energy to resonate around the antenna. More particularly, the geometric configuration of the RF chamber 124 can be set to provide a desired separation distance between the antenna of the transponder 125 and the inner surfaces of the RF chamber 124 (e.g., changing the air gap between the antenna and the inner surfaces of the RF chamber). By tuning the separation distance, RF signals can bounce or resonate around the antenna.

Figure 6:
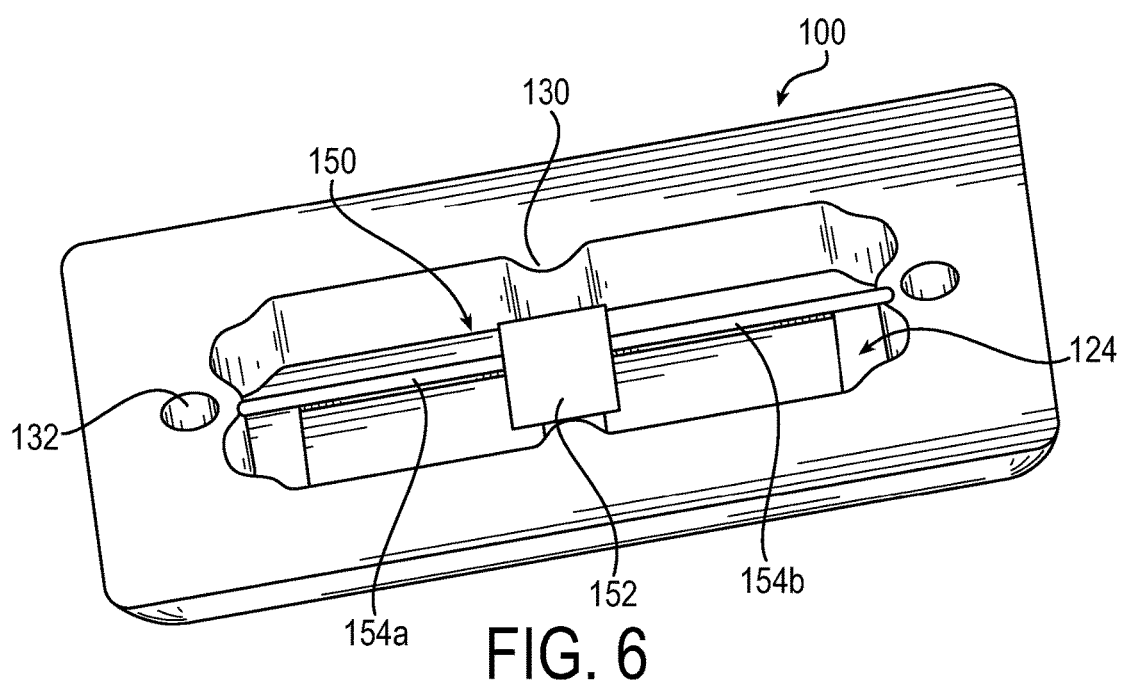
FIG. 6 is a bottom perspective view of an exemplary RFID-enabled container showing a support structure.

Additionally, engagement members can be formed in the RF chamber 124 that enable the RF transponder and/or antenna to be suspended within the chamber (e.g., the transponder/antenna appear to float within the RF chamber). Such engagement members preferably are formed to provide adequate support for the RF transponder without significantly attenuating the RF signal. For example, two or more elongated members each coupled to one inner surface of the RF chamber can provide a support surface for the RF transponder. FIG. 6 illustrates such support structure 150, which includes a base 152 supported by elongated members 154a and 154b, the elongated members being attached to an inner wall of the RF chamber. The RF transponder 125 can be attached to the base 152 to secure the RF transponder within the RF chamber 124. Although only two elongated members 154a and 154b are shown, it will be appreciated that more can be used to provide enhanced rigidity of the support structure.

At least a portion of the top wall 112 preferably has a wall thickness that is less than a wall thickness of other walls of the container 100. The thinner portions of the top wall 112 form one or more windows 128 arranged relative to the antenna, the one or more windows providing low attenuation of a signal into and out of the RF chamber relative to other portions of the container 100. Preferably, a wall thickness for the one or more window portions is 0.050 inches.

It is noted that the term "window" describes a characteristic of the thin portions of the walls (e.g., the thin portions have the appearance of a window). The term "window" does not necessarily mean that such thin portions are transparent to visible light.

The chamber 124 may be formed with one or more locating tabs 130 in the inner walls of the chamber. The locating tabs 130 can be arranged to correspond with the RFID transducer 125 so as to positionally fix the RFID transducer 125 relative to the body 110 and RF chamber 124. Additionally or alternatively, mounting means 132, such as a threaded receiver for receiving a screw or a hole for receiving a rivet, can be formed in the body 110 to fixedly attach the RFID transducer 125 to the body 110.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID)-enabled article, the article comprising:

a housing formed from a first material and having an RF chamber, the housing including a first outer wall, a second outer wall arranged relative to the first outer wall, and at least one sidewall connecting the first outer wall to the second outer wall, wherein the at least one sidewall is sloped relative to the first and second outer walls;

an RFID transponder arranged within the chamber, the RFID transponder including an antenna for transmitting and receiving data, wherein the RF chamber is dimensioned to form a pocket around the antenna such that the antenna is separated from each inner surface of the chamber by a predefined minimum distance, wherein the pocket is dimensioned to cause RF energy to resonate around the antenna; and a plurality of locating tabs arranged in inner walls of the RF chamber, the locating tabs configured to positionally fix the RFID transponder relative to the RF chamber.

2. The article of claim 1, wherein the housing comprises at least one window arranged relative to the antenna, the window having a wall thickness that is less than a wall thickness of other portions of the housing.

3. The article of claim 2, wherein the window is configured to provide low attenuation of a signal into and out of the RF chamber.

4. The article of claim 1, further comprising at least one cover arranged over the chamber, wherein the cover has a wall thickness that is less than a wall thickness of other portions of the housing.

5. The article of claim 1, wherein the RFID transponder is covered by a layer formed of a plastic or other polymeric second material which may the same as or different from the first material.

6. The article of claim 1, wherein the pocket is formed around all sides of the antenna.

7. The article of claim 1, comprising:
at least one window formed in the housing over the chamber, the at least one window providing low attenuation of a signal into and out of the RF chamber.

8. The article of claim 1, wherein a length, width and thickness of the chamber is greater than a respective length, width and thickness of the RFID transponder.

9. The article of claim 1, wherein the housing is formed from a non-conductive material.

10. The article according to claim 9, wherein the non-conductive material comprises plastic.

11. The article of claim 9, wherein the article is a container.

12. A method of forming a radio frequency identification (RFID)-enabled article, RFID article including an RFID transponder and antenna for transmitting and receiving data, the method comprising:
forming a radio frequency (RF) chamber around the RFID enabled article, wherein the RF chamber is dimensioned to form a pocket around the antenna such that the antenna is separated from each inner surface of the chamber by a predefined minimum distance, wherein the pocket is dimensioned to cause RF energy to resonate around the antenna, and forming a plurality of locating tabs in inner walls of the RF chamber, the locating tabs configured to positionally fix the RFID transponder relative to the RF chamber,
wherein forming the radio frequency chamber includes forming a first outer wall, forming a second outer wall arranged relative to the first outer wall, wherein the RF chamber is arranged between the first outer wall and the second outer wall, and forming at least one sidewall that connects the first outer wall to the second outer wall, wherein the at least one sidewall is sloped relative to the first and second outer walls.

13. The method of claim 12, further comprising forming at least one window in the housing and relative to the antenna, the window having a wall thickness that is less than a wall thickness of other portions of the housing.

14. The method according to claim 12, further comprising covering the RFID transponder with a layer formed of polymeric material.

* * * * *